(No Model.)

J. D. WESTGATE.
Clutch.

No. 229,652. Patented July 6, 1880.

Witnesses
L. F. Connor
Jos. P. Livermore

Inventor
Joseph D. Westgate,
by Crosby Gregory, Attys

UNITED STATES PATENT OFFICE.

JOSEPH D. WESTGATE, OF SALEM, ASSIGNOR TO GEORGE JENKINS AND E. Q. BACHELLER, OF LYNN, MASSACHUSETTS, ONE-THIRD TO EACH.

CLUTCH.

SPECIFICATION forming part of Letters Patent No. 229,652, dated July 6, 1880.

Application filed March 15, 1880. (No model.)

*To all whom it may concern:*

Be it known that I, JOSEPH D. WESTGATE, of Salem, county of Essex, and State of Massachusetts, have invented an Improvement in Clutches, of which the following description, in connection with the accompanying drawings, is a specification.

This invention relates to improvements in clutches to confine a pulley upon a rotating shaft, or release it therefrom so as to run loose, according as it is desired.

In this invention the belt-pulley placed loosely upon the shaft to be driven by it is provided with a radially movable or adjustable hub, and with a pivoted clamping dog or lever, which is carried by and rotated positively with the said pulley at all times, and this clamping dog or lever has its short end bent or turned so as to directly engage the shaft to be driven by the pulley; and the said dog is operated at the proper times to cause it to engage the shaft and hold the pulley upon it by means of a sliding conical wedge under the control of a suitable shipper.

Figure 1:
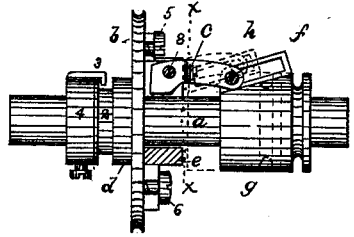
Figure 4:
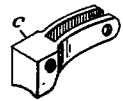
Figure 2:
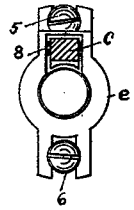
Figure 3:
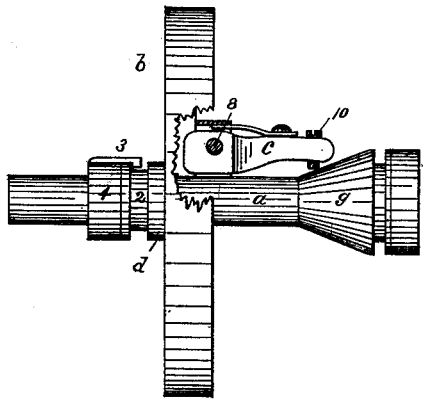

Figure 1 represents, in side elevation and partial section, a shaft-pulley and clamping-dog constructed in accordance with my invention; Fig. 2, a view of the front of the pulley, looking at it from the line *x x*, Fig. 1; Fig. 3, a modification to be referred to, and Fig. 4 the clamping-dog separated from the machine.

The shaft *a* is supposed to be the main shaft in a machine to which it is desired to apply my clutch contrivance; *b*, the belt or other pulley, which is to run freely thereon unless clamped thereto by the clamping-dog *c*. The fixed hub *d* of the pulley has an annular groove, 2, to receive a hook, 3, connected with the collar 4, attached firmly to shaft *a*. The finger permits the pulley to rotate on the shaft *a*, but prevents longitudinal motion thereon.

The hub *e*, (see Figs. 1 and 2,) instead of being a fixed part of the pulley, is made separate therefrom, and held at the face of the pulley by the screws 5 6, placed in slots in ears of the hub. (See Fig. 2.)

The clamping-dog *c* is made as a lever, pivoted to the hub by pivot 8. The short arm of the dog or lever is turned down toward and so as to bear upon the shaft *a* and clamp it closely by a slight movement of the dog. This movement, in Fig. 1, is caused by a wedging-surface, (shown as a slotted bar or projection, *f*, attached to the sliding collar *g*,) a pin, *h*, at the rear end of the said dog entering the slot in the said bar or projection.

When the collar *g* is drawn away from the pulley, as in full lines, Fig. 1, the pulley is free to rotate without turning the shaft; but if the collar *g* is pushed toward the left, Fig. 1, into the dotted-line position, the short end of the dog will be jammed or forced against the shaft, clutching the pulley *b* to it, after which the pulley will drive the said shaft. During the time that the dog is being forced in contact with the said shaft the loose hub is moved in a direction transverse to the length of the said shaft, and is drawn snugly against the shaft opposite the point where the dog bears upon it.

Instead of making the wedging-surface as a slotted bar on a collar, I may employ a conical collar (see Fig. 3) to act upon an adjustable toe, 10, at the outer end of the dog.

If desired, I may pivot the dog on a fixed part or hub of the pulley *b*.

This apparatus is of great utility in many machines, such as paper-cutters, looms, sewing-machines, and others wherever it is desired to drive a shaft intermittingly.

I do not broadly claim a wedge-like device to move outwardly slide-bars to clamp the inner flange of a pulley-rim, as I know that to be old; neither do I claim a clamping-lever operated by a knee and made to engage the hub of a pulley, the said clamping-lever being carried by a hub fixed upon and so as to rotate with the shaft upon which the pulley is placed.

My improved pulley is very simple in construction, cheap, and efficient in operation.

I claim—

1. The shaft *a* and belt-pulley *b*, loose thereon, and the clamping dog or lever *c*, carried by and rotated with the said pulley, the said clamping-dog having its short arm turned inward toward the shaft, combined with the wedge-surfaced cone to operate the clamping dog or lever and cause it to directly engage the shaft $a$ and secure the pulley to it, as and for the purpose described.

2. The shaft $a$, belt-pulley $b$, and the radially-adjustable hub $e$, attached therewith loosely, as shown and described, combined with the clamping dog or lever $c$, pivoted upon the said movable hub, and the inclined surface to operate the said clamping-dog, whereby the said dog is made to directly engage the shaft $a$ at one side and the concaved inner face of the movable hub at its other side, as and for the purpose described.

In testimony whereof I have signed my name to this specification in the presence of two subscribing witnesses.

JOSEPH D. WESTGATE.

Witnesses:
G. W. GREGORY,
L. F. CONNOR.